J. L. Kretser,
Hanging Saws.
No. 107,788. Patented Sep. 27, 1870.
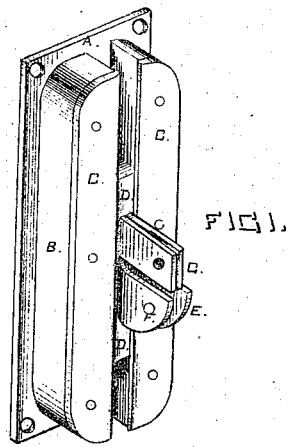
WITNESSES.
W. M. Hornor.
E. Sampson Blake
INVENTOR.
Joel L. Kretser
By J. B. Smith
his Atty in fact

United States Patent Office.

JOEL L. KRETSER, OF TUSTEN, WISCONSIN.

Letters Patent No. 107,788, dated September 27, 1870.

IMPROVEMENT IN PITMAN-HEADS.

The Schedule referred to in these Letters Patent and making part of the same.

I, JOEL L. KRETSER, of Tusten, in the county of Waushara, in the State of Wisconsin, have invented certain Improvements in Pitman-Heads, of which the following is a specification.

Nature and Object of the Invention

Is to have a pitman-head that the pitman will work outside of the slides, and keep steady under a quick motion, and be always in position.

Description of the drawing forming part of this Specification.

Figure I is a perspective view of my invention.

General Description.

A is the bed-pieces, to be be bolted onto some permanent fixture.

B, the jaws or slides.

C C, cap-pieces, bolted onto the slide-pieces B, to hold the head in. These slide-pieces B can be fastened onto bed-pieces A, with bolts and slide-slots, so as to be made adjustable, to take in a large or small head, as may be desired.

D, the part of pitman-head sliding back of the caps C C.

E, jaws to receive the top or end of the pitman.

F, pin, with which to hold the pitman to the jaws.

G, jaws to hold the saw.

The bed-piece, jaws, and caps may be all cast in one piece, if desired, but, in that case, would not be adjustable; or the jaws B and cap C may be cast whole, and the parts D, E, and G may be made all in one piece, either of wrought iron or malleable iron, if desired.

Claim.

I claim as my invention—

A pitman-head, made with parts A, B, and C, whole or in parts, in combination with the part D, sunken below caps C C, jaws E, to receive the head of a pitman, and jaws G, to fasten a saw to, said jaws E and G projecting in front of caps C C, substantially as for the purpose specified.

JOEL L. KRETSER.

Witnesses:
A. H. RUSSELL,
JACOB QUANT.